(12) United States Patent
Ozaki

(10) Patent No.: US 11,883,997 B2
(45) Date of Patent: Jan. 30, 2024

(54) OFF-CENTER CONTAINER MANUFACTURING METHOD AND TEMPERATURE ADJUSTMENT MOLD

(71) Applicant: NISSEI ASB MACHINE CO., LTD., Nagano (JP)

(72) Inventor: Yasuo Ozaki, Nagano (JP)

(73) Assignee: NISSEI ASB MACHINE CO., LTD., Nagano (JP)

(*) Notice: Subject to any disclaimer, the term of this patent is extended or adjusted under 35 U.S.C. 154(b) by 186 days.

(21) Appl. No.: 17/431,570

(22) PCT Filed: Feb. 20, 2020

(86) PCT No.: PCT/JP2020/006744
§ 371 (c)(1),
(2) Date: Jan. 18, 2022

(87) PCT Pub. No.: WO2020/171160
PCT Pub. Date: Aug. 27, 2020

(65) Prior Publication Data
US 2022/0134629 A1  May 5, 2022

(30) Foreign Application Priority Data
Feb. 21, 2019 (JP) .................... 2019-029862

(51) Int. Cl.
*B29C 49/06* (2006.01)
*B29C 49/12* (2006.01)
(Continued)

(52) U.S. Cl.
CPC ............ *B29C 49/071* (2022.05); *B29C 49/06* (2013.01); *B29C 49/12* (2013.01); *B29C 49/64* (2013.01);
(Continued)

(58) Field of Classification Search
CPC ...... B29C 2049/48825; B29C 49/6445; B29C 49/6435; B29C 49/4242; B29C 49/071; B29C 2949/0724
See application file for complete search history.

(56) References Cited

U.S. PATENT DOCUMENTS

| 4,724,116 A | 2/1988 | Aoki et al. |
| 2005/0068182 A1 | 3/2005 | Dunlap et al. |

(Continued)

FOREIGN PATENT DOCUMENTS

| EP | 3 059 069 A1 | 8/2016 |
| JP | 59-73925 A | 4/1984 |

(Continued)

OTHER PUBLICATIONS

Mechanical translation of Uehara (JP 2005-7786 A) dated Jan. 2005. (Year: 2005).*

(Continued)

*Primary Examiner* — Robert B Davis
(74) *Attorney, Agent, or Firm* — Greenblum & Bernstein, P.L.C.

(57) ABSTRACT

A method of manufacturing an off-center container includes: stretching a preform made of resin having a bottomed shape with a stretching rod, heating the preform; and blow-molding the off-center container, in which a central axis of a neck portion is displaced from a central axis of a body portion, by introducing a pressurized fluid into the preform disposed in a mold. The container has a flat shape and a dimension in a first direction in a cross section is longer than in a second direction perpendicular to the first direction. In a circumferential cross section of the preform, a thickness of a first region corresponding to a surface extending in the first direction of the container is set to be thicker than a thickness (Continued)

of a second region corresponding to a surface extending in the second direction of the container.

5 Claims, 10 Drawing Sheets

(51) Int. Cl.
    *B29C 49/64*     (2006.01)
    *B29C 49/48*     (2006.01)
    *B29C 49/00*     (2006.01)
    *B29L 31/00*     (2006.01)

(52) U.S. Cl.
    CPC . *B29C 2949/0724* (2022.05); *B29L 2031/712* (2013.01)

(56) References Cited

U.S. PATENT DOCUMENTS

| | | | |
|---|---|---|---|
| 2013/0236589 A1* | 9/2013 | Yamaguchi | B29C 49/4823 425/526 |
| 2018/0257264 A1* | 9/2018 | Kawamura | B29B 11/08 |

FOREIGN PATENT DOCUMENTS

| | | | | |
|---|---|---|---|---|
| JP | 60-17309 U | | 2/1985 | |
| JP | 2-117811 A | | 5/1990 | |
| JP | 04323018 A | * | 11/1992 | ......... B29C 49/4242 |
| JP | 7-156933 A | | 6/1995 | |
| JP | 2000-127230 A | | 5/2000 | |
| JP | 2005-7786 A | | 1/2005 | |
| JP | 2006-62110 A | | 3/2006 | |
| JP | 4209267 B2 | | 1/2009 | |
| JP | 2017-159619 A | | 9/2017 | |
| WO | WO-2017090774 A1 | * | 6/2017 | ............. B29B 11/08 |

OTHER PUBLICATIONS

International Search Report issued in International Patent Application No. PCT/JP2020/006744, dated May 19, 2020, along with English translation thereof.

Written Opinion of the International Searching Authority issued in International Patent Application No. PCT/JP2020/006744, dated May 19, 2020, along with English translation thereof.

Extended Supplementary Search Report and European Search Opinion issued in European Patent Application No. 20759810.3 dated Sep. 30, 2022.

\* cited by examiner

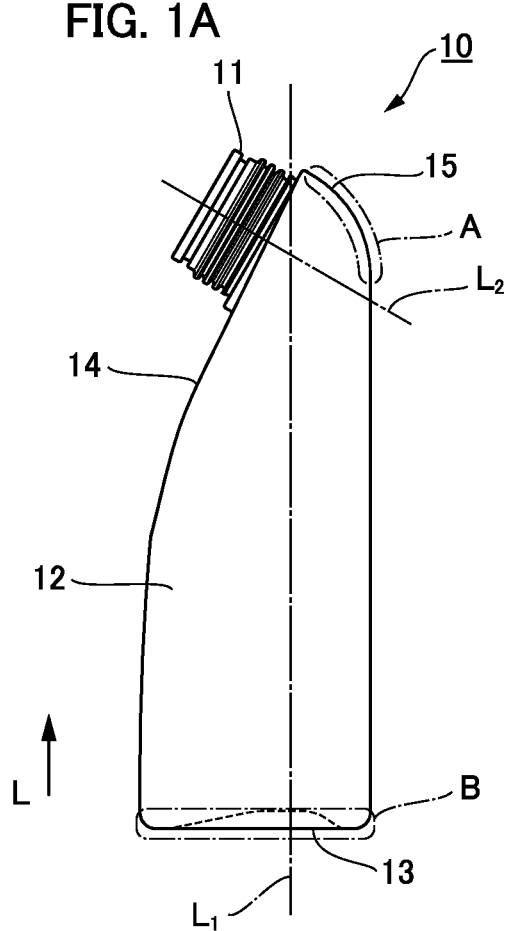
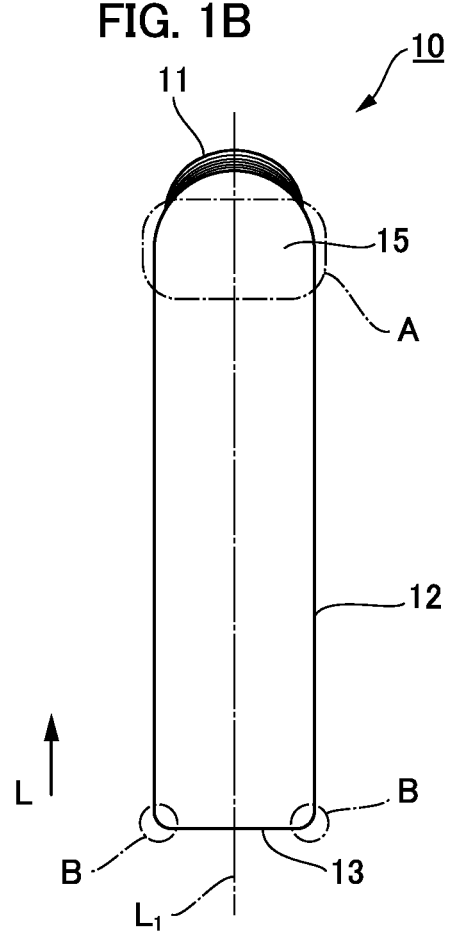
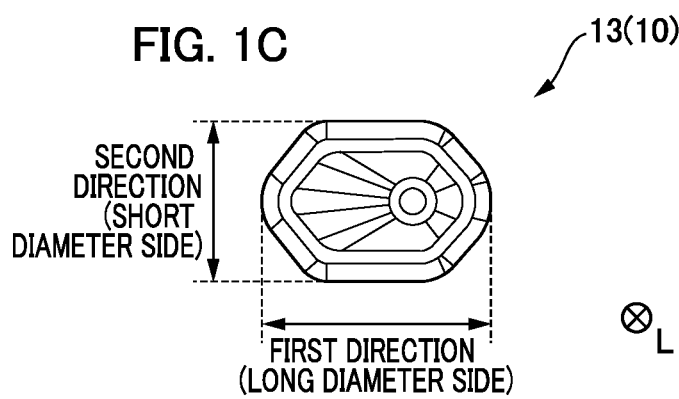

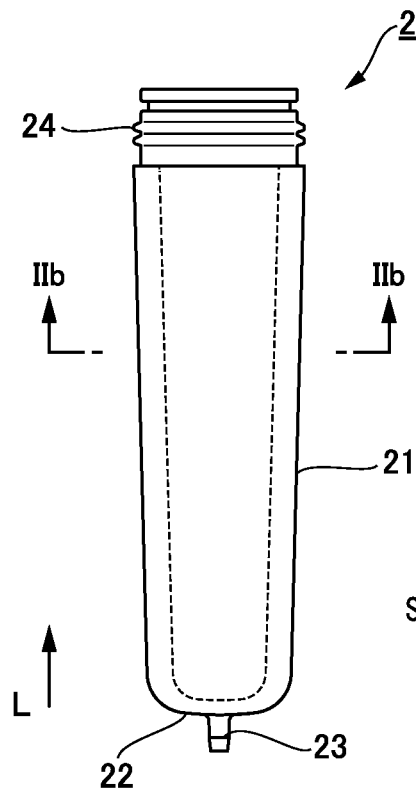
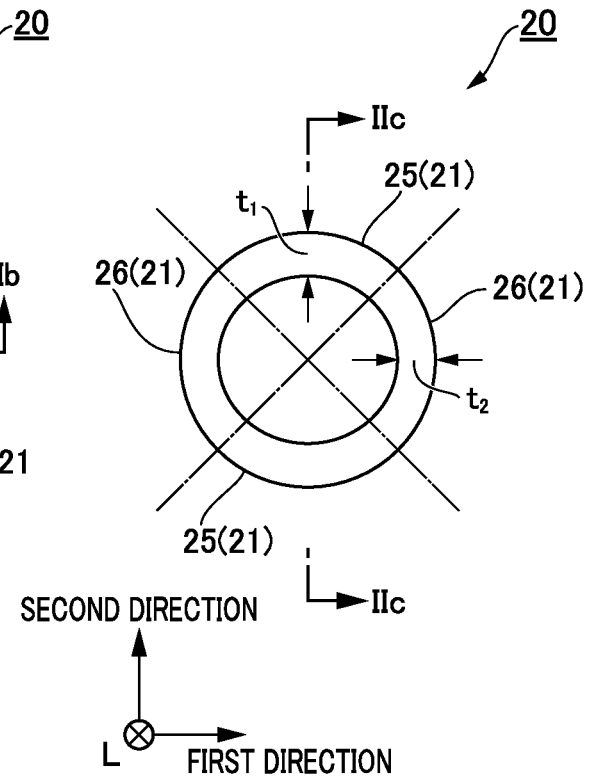
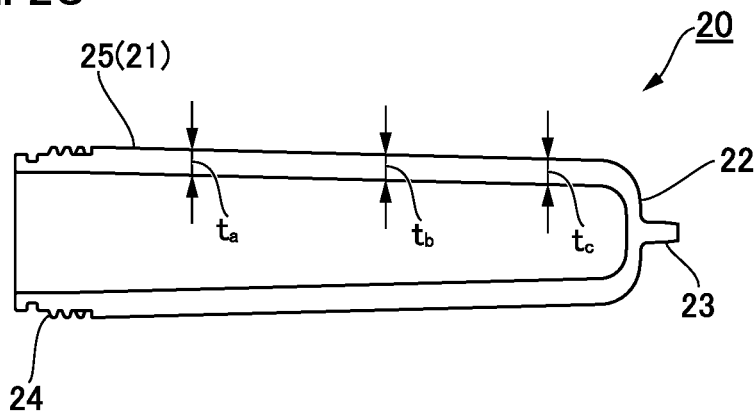

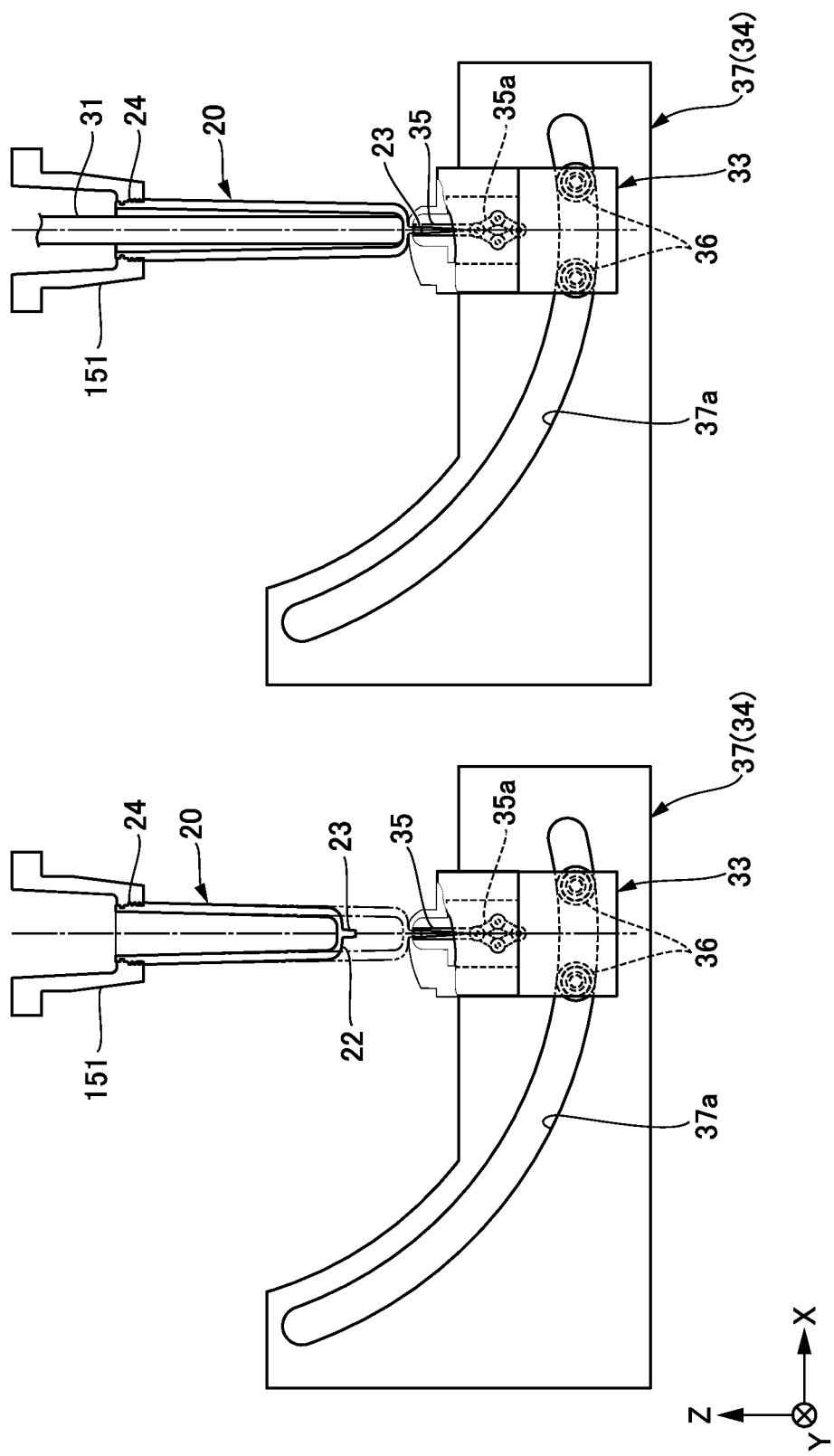

FIG. 10A
FIG. 10B
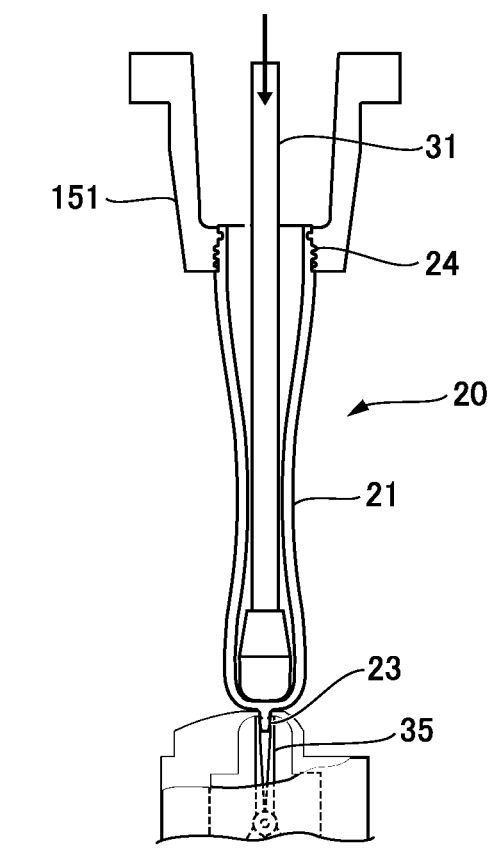
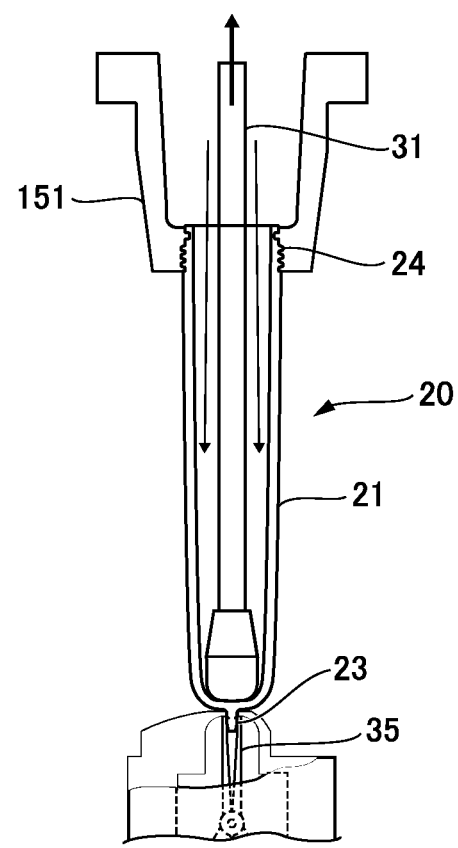
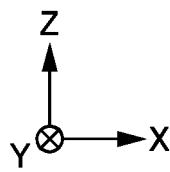

OFF-CENTER CONTAINER MANUFACTURING METHOD AND TEMPERATURE ADJUSTMENT MOLD

BACKGROUND OF THE INVENTION

Field of the Invention

The present invention relates to a method of manufacturing an off-center container and a temperature adjustment mold.

Description of the Related Art

Conventionally, there has been known an off-center container (off-centered bottle) made of resin in which a central axis of a neck portion is not coaxial with a body portion. Examples of the off-center container include a neck bent container in which the central axis of a container neck portion is inclined with respect to an axial direction of a container body portion or a container bottom portion, and a container in which the degree of off-centering (off-centering degree) of the central axis of the container body portion or the container bottom portion with respect to the central axis of the container neck portion is large. As a method for manufacturing this type of off-center container, for example, an extrusion blow molding method or a stretch blow molding method can be used.

When the off-center container is manufactured by the extrusion blow molding method, the above-described neck bent container and the container having a large off-centering degree can also be relatively easily manufactured. However, a container manufactured by the extrusion blow molding method is generally inferior to a container manufactured by the stretch blow molding method in terms of aesthetic appearance, dimensional accuracy, and the like. In addition, according to the direct blow molding method, a post-process such as cutting off of a burr remaining on the container after blow-molding and trimming of the cut surface is required, and the amount of resin to be discarded is large.

Under such a background, there is an increasing demand for manufacturing an off-center container even having a shape that is relatively difficult to process by the stretch blow molding method. For example, JP 4209267 B2 proposes that a bottom portion of a preform is pushed up by a stretching rod and gripped by an upper bottom mold, the preform is bent at a predetermined angle, and then high-pressure air is blown into the preform to mold a neck bent container.

According to the method of JP 4209267 B2 described above, for example, the container becomes thin at a portion where the deformation amount of the preform is large such as a shoulder portion of the container, and the strength of the container tends to be insufficient at such a portion. In addition, when the bottom portion of the preform cannot be appropriately held by the bottom mold, the variation in thickness distribution and appearance of the container to be manufactured increases, which adversely affects the quality of the container.

SUMMARY OF THE INVENTION

A method of manufacturing an off-center container according to an aspect of the present invention includes: stretching a preform having a bottomed shape with a stretching rod, the preform is made of resin and heated; and blow-molding the off-center container, in which a central axis of a container neck portion is displaced from a central axis of a container body portion, by introducing a pressurized fluid into the preform disposed in a mold. The off-center container has a flat shape in which a dimension in a first direction in a container cross section is longer than a dimension in a second direction perpendicular to the first direction. In a circumferential cross section of the preform, a thickness of a first region corresponding to a surface extending in the first direction of the container is set to be thicker than a thickness of a second region corresponding to a surface extending in the second direction of the container.

An off-center container manufacturing method according to another aspect of the present invention includes: heating a preform having a bottomed shape and made of resin containing residual heat after injection molding to adjust a temperature; stretching the heated preform with a stretching rod; and blow-molding an off-center container in which a central axis of a container neck portion is displaced from a central axis of a container body portion by introducing a pressurized fluid into the preform disposed in a mold. The preform includes a protrusion portion protruding outward from a bottom portion. The method performs cooling of the protrusion portion when adjusting the temperature.

Further features of the present invention will become apparent from the following description of exemplary embodiments with reference to the attached drawings.

BRIEF DESCRIPTION OF THE DRAWINGS

FIG. 1A is a front view of a container, FIG. 1B is a right side view of the container, and FIG. 1C is a bottom view of the container.

FIG. 2A is a front view of a preform, FIG. 2B is a cross-sectional view taken along line IIb-IIb in FIG. 2A, and FIG. 2C is a cross-sectional view taken along line IIc-IIc in FIG. 2B.

FIGS. 7A and 7B are view illustrating processes in a blow molding unit.

FIGS. 10A and 10B are view illustrating a modification of a preform stretching process.

DESCRIPTION OF THE EMBODIMENTS

Figure 3:
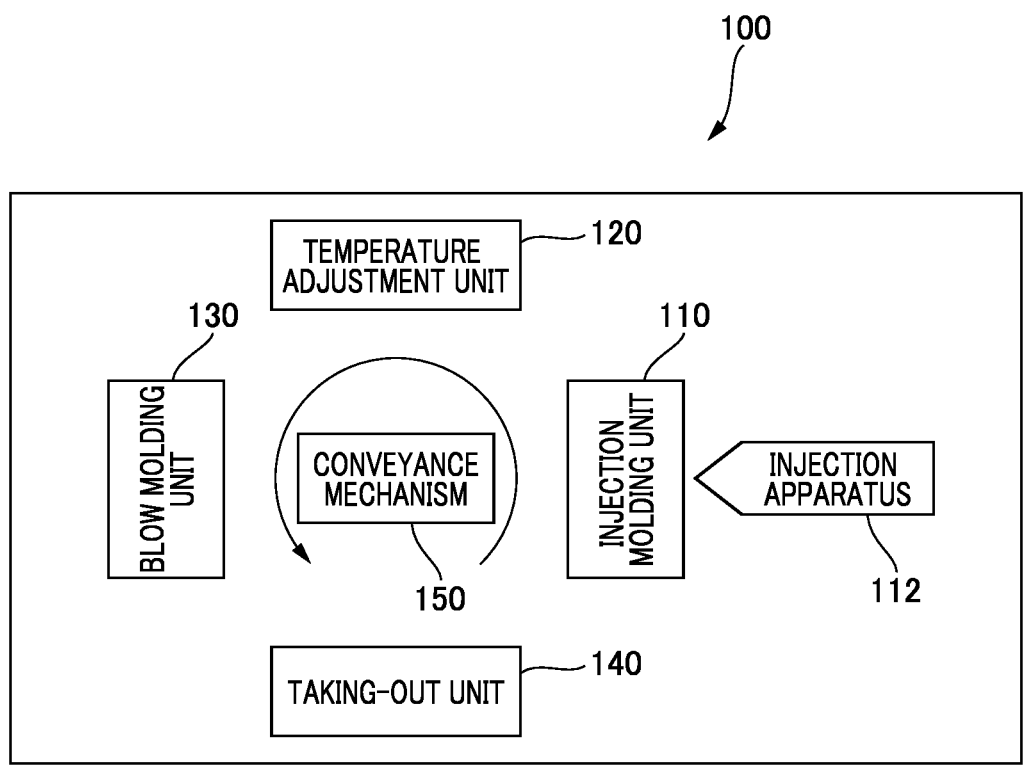
FIG. 3 is a block diagram schematically illustrating a configuration of a blow molding apparatus.

Embodiments of the present invention will be described below with reference to the drawings.

In the embodiments, for the sake of easy understanding, structures and elements other than the main part of the present invention will be described in a simplified manner or omitted. In addition, in the drawings, the same elements are denoted by the same reference numerals. Note that, in the drawings, the thickness, shape, and the like of a container and a preform are schematically illustrated, and do not indicate actual thickness, shape, and the like.

Configuration Example of the Off-Center Container

First, a configuration example of an off-center container (hereinafter simply referred to as a container) 10 made of resin according to the present embodiment will be described with reference to FIGS. 1A to 1C.

FIG. 1A is a front view of the container 10, FIG. 1B is a right side view of the container 10, and FIG. 1C is a bottom view of the container 10. In FIGS. 1A to 1C, an axial direction L of the container is indicated by an arrow.

As illustrated in FIG. 1A, the container 10 is a neck bent container in which a central axis $L_2$ of a container neck portion is inclined with respect to a central axis $L_1$ of a container body portion and a container bottom portion.

The container 10 includes a neck portion 11 serving as an entrance and exit in an upper part of the container, a body portion 12 defining a side wall portion of the container 10, and a bottom portion 13 formed so as to be continuous with the body portion 12 and positioned at the lowermost end of the container 10. The body portion 12 is formed such that a length (diameter) from the left side surface side to the right side surface side of the container 10 illustrated in FIG. 1A gradually narrows upward. Therefore, on the upper surface side of the container 10, an inclined portion 14 that is inclined from the left side surface side to the right side surface side of the container 10 and connects the neck portion 11 and the container left side surface, and a shoulder portion 15 that connects the neck portion 11 and the container right side surface are formed.

In addition, as illustrated in FIG. 1C, the bottom portion 13 of the container 10 has a flat outer shape having a long dimension in a first direction between the left side surface and the right side surface and a short dimension in a second direction perpendicular to the first direction, and has, for example, a flat polygonal shape (hexagonal shape) or a substantially elliptical shape. The cross-sectional shape of the body portion 12 is also similar to that of the bottom portion 13 of the container 10. When describing the cross section of the body portion 12 of the container 10 or the shape of the bottom portion 13, the first direction is also referred to as a long diameter side, and the second direction is also referred to as a short diameter side.

The material of the container 10 is a thermoplastic synthetic resin, and can be appropriately selected according to the application of the container 10. Specific examples of types of the material include polyethylene terephthalate (PET), polyethylene naphthalate (PEN), polycyclohexanedimethylene terephthalate (PCTA), Tritan ((registered trademark): co-polyester manufactured by Eastman Chemical Company), polypropylene (PP), polyethylene (PE), polycarbonate (PC), polyethersulfone (PES), polyphenylsulfone (PPSU), polystyrene (PS), cyclic olefin polymer (COP/COC), polymethyl methacrylate: acrylic (PMMA), polylactic acid (PLA), and the like.

Configuration Example of the Preform

FIGS. 2A to 2C illustrates an example of a preform 20 applied to the manufacture of the container 10 of the present embodiment.

FIG. 2A is a front view of the preform 20, FIG. 2B is a cross-sectional view taken along line IIb-IIb in FIG. 2A, and FIG. 2C is a cross-sectional view taken along line IIc-IIc in FIG. 2B. In FIGS. 2A and 2B, an axial direction L of the preform 20 is indicated by an arrow.

The entire shape of the preform 20 is a bottomed cylindrical shape in which one end side is opened and the other end side is closed. The preform 20 includes a body portion 21 formed in a cylindrical shape, a bottom portion 22 that closes the other end side of the body portion 21, a protrusion portion 23 formed on the bottom portion 22, and a neck portion 24 formed at an opening on the one end side of the body portion 21. The protrusion portion 23 is formed so as to protrude from the bottom portion 22 to the outside of the preform 20 along the axial direction L. Note that the protrusion portion 23 is set to have a larger diameter in a cross section than a gate mark (not illustrated) of a hot runner connected immediately below the protrusion portion 23.

The thickness of the preform 20 varies depending on the circumferential position of the preform 20.

As illustrated in FIG. 2B, the region in the circumferential direction of the preform 20 is divided into four, and the four regions are roughly classified into two types: a first region 25 and a second region 26. Two first regions 25 and two second regions 26 are alternately disposed in the circumferential direction of the preform 20. The circumferential lengths of the two first regions 25 are set to be equal, and the circumferential lengths of the two second regions 26 are also set to be equal.

The first regions 25 of the preform 20 face in the second direction and mainly constitute a surface extending on the long diameter side of the container 10 after blow molding. The second regions 26 of the preform 20 face in the first direction and mainly constitute a surface extending on the short diameter side of the container 10 after blow molding. At the same position in the axial direction of the preform 20, a thickness $t_1$ of the first region 25 corresponding to the surface extending on the long diameter side of the container 10 is set to be thicker than a thickness $t_2$ of the second region 26 corresponding to the surface extending on the short diameter side of the container 10 ($t_1 > t_2$).

In addition, the thickness of the first region 25 of the preform 20 varies depending on the axial position of the preform 20.

As illustrated in FIG. 2C, the thickness of the first region 25 is set such that the other end side (bottom portion side) is thicker than the one end side (opening side). For example, when the thicknesses of three points $t_a$, $t_b$, and $t_c$ sequentially set from the one end side to the other end side of the second region 26 along the axial direction of the preform 20 are compared, the thicknesses increase in the order of $t_a$, $t_b$, and $t_c$, and the relationship of $t_a < t_b < t_c$ is established.

Although not illustrated, the thickness of the second region 26 of the preform 20 may be the same regardless of the position in the axial direction of the preform 20, and may be set such that the other end side (bottom portion side) is thicker than the one end side (opening side) as in the first region 25 as necessary.

Description of the Blow Molding Apparatus

Next, a blow molding apparatus 100 for manufacturing the container 10 will be described with reference to FIG. 3. FIG. 3 is a block diagram schematically illustrating a configuration of the blow molding apparatus 100. The blow molding apparatus 100 according to the present embodiment is a hot parison type (also referred to as a one-stage type) apparatus that performs blow molding by utilizing residual heat (internal heat quantity) during injection molding without cooling the preform 20 to room temperature.

The blow molding apparatus 100 includes an injection molding unit 110, a temperature adjustment unit 120, a blow molding unit 130, a taking-out unit 140, and a conveyance mechanism 150. The injection molding unit 110, the temperature adjustment unit 120, the blow molding unit 130, and the taking-out unit 140 are disposed at positions rotated by a predetermined angle (for example, 90 degrees) about the conveyance mechanism 150.

The conveyance mechanism 150 includes a rotary plate (not illustrated) that rotates about an axis in a direction perpendicular to the sheet of paper of FIG. 3 (Z direction). On the rotary plate, one or more neck molds 151 (not illustrated in FIG. 3) for holding the neck portion of the preform 20 or the container 10 are disposed at each predetermined angle. The conveyance mechanism 150 rotates the rotary plate to convey the preform 20 (or the container 10) having the neck portion held by the neck mold 151 to the injection molding unit 110, the temperature adjustment unit 120, the blow molding unit 130, and the taking-out unit 140 in this order.

The injection molding unit 110 includes an injection cavity mold and an injection core mold, which are both not illustrated, and manufactures the preform 20 illustrated in FIGS. 2A to 2C. An injection apparatus 112 that supplies a resin material, which is a raw material of the preform, is connected to the injection molding unit 110.

In the injection molding unit 110, the injection cavity mold, the injection core mold, and the neck mold 151 of the conveyance mechanism 150 are closed to form a preform-shaped mold space. Then, by pouring the resin material from the injection apparatus 112 into the preform-shaped mold space, the preform 20 is manufactured by the injection molding unit 110. Note that it is sufficient if adjustment of the uneven thickness of the preform 20 illustrated in FIGS. 2A to 2C is performed by forming the cross section of at least one of the injection cavity mold and the injection core mold in a flat shape.

Note that even when the injection molding unit 110 is opened, the neck mold 151 of the conveyance mechanism 150 is not opened, and the preform 20 is held and conveyed. The number of preforms 20 simultaneously molded by the injection molding unit 110 (i.e., the number of containers 10 that can be simultaneously molded by the blow molding apparatus 100) can be appropriately set.

The temperature adjustment unit 120 includes a temperature adjustment mold (temperature adjustment pot) 121 capable of accommodating the preform 20. The temperature adjustment unit 120 accommodates the preform 20 in the temperature adjustment mold 121, and adjusts the temperature of the preform 20 manufactured by the injection molding unit 110 to a temperature suitable for final blowing (for example, about 90 to 100° C.)

Figure 4:
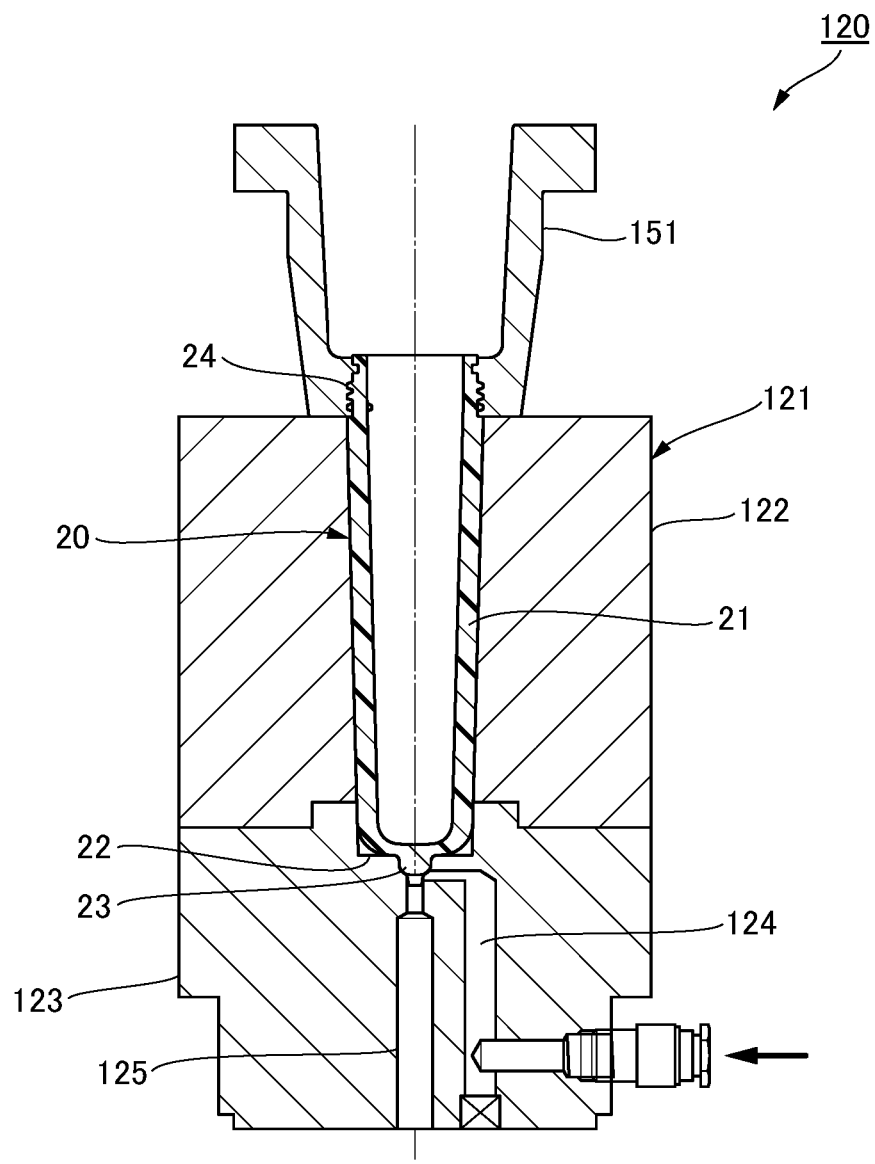
FIG. 4 is a diagram schematically illustrating a configuration example of a temperature adjustment mold.

FIG. 4 is a diagram schematically illustrating a configuration example of the temperature adjustment mold 121.

The temperature adjustment mold 121 includes a heating pot mold 122 that heats the body portion 21 of the preform 20 and a cooling unit 123 that locally cools the protrusion portion 23 of the preform 20.

The heating pot mold 122 has a space for accommodating the body portion 21 of the preform 20 from below the neck portion 24 to the vicinity of the bottom portion of the preform 20, and is heated by a heating means (not illustrated) such as a heater. The temperature of the preform 20 is adjusted as described above by the heat generated from the heating pot mold 122.

In addition, the cooling unit 123 is disposed at a position corresponding to the bottom portion 22 of the preform 20 in the temperature adjustment mold 121. In the cooling unit 123, an air supply path 124 for supplying air, which is an example of a refrigerant, for cooling the protrusion portion 23, and an exhaust path 125 for releasing the air after cooling the protrusion portion 23 to the outside are connected to a portion accommodating the protrusion portion 23. Thus, the cooling unit 123 is configured to be able to cool the protrusion portion 23 of the preform 20 with air.

The blow molding unit 130 performs blow molding on the preform 20 whose temperature has been adjusted by the temperature adjustment unit 120 to manufacture the container 10.

The blow molding unit 130 includes a blow molding mold 30 corresponding to the shape of the container 10, a stretching rod 31 for stretching the preform 20, and a blow nozzle (not illustrated).

Figure 5B:
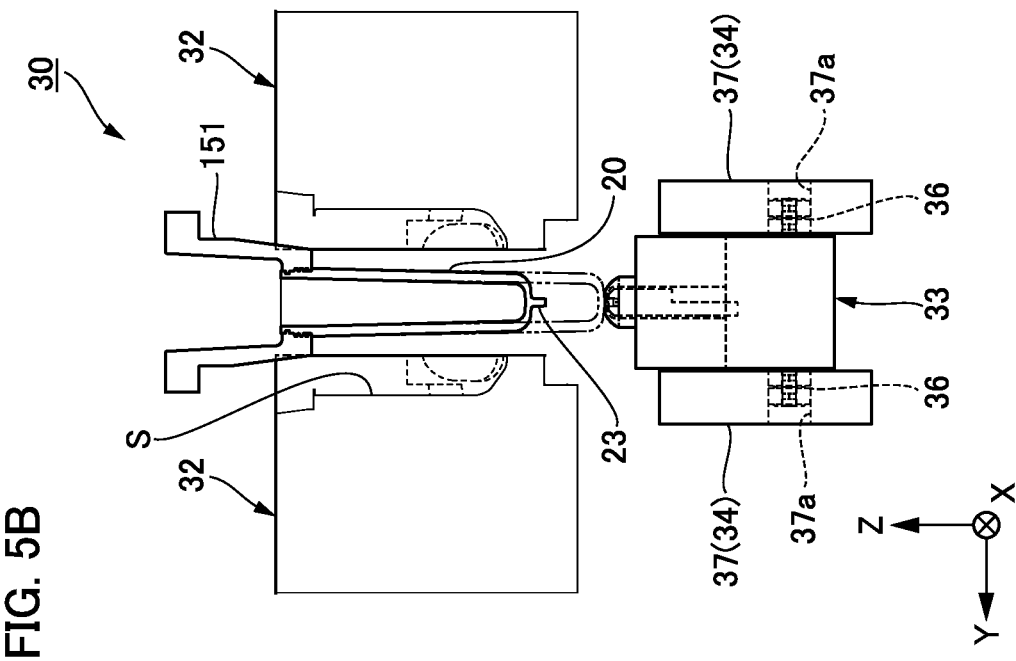
FIG. 5B is a left side view of the blow molding mold.
Figure 5A:
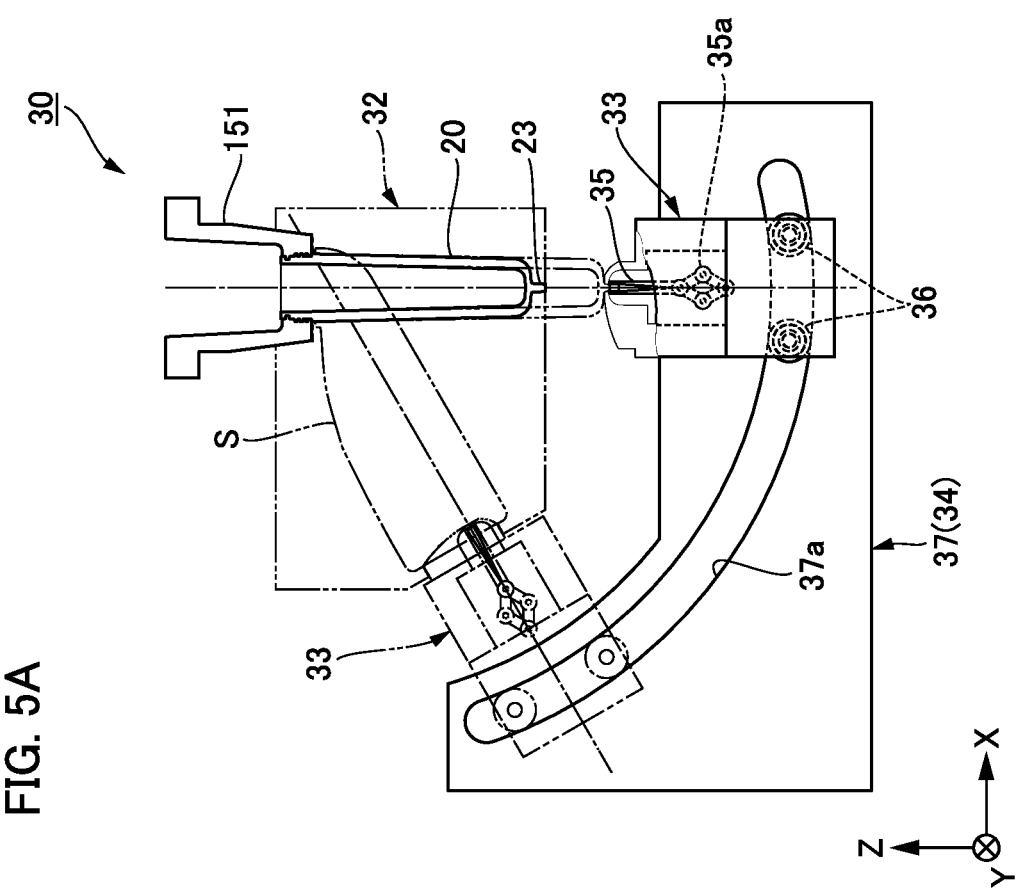
FIG. 5A is a front view of a blow molding mold.

A configuration example of the blow molding mold 30 will be described with reference to FIGS. 5A and 5B. FIG. 5A is a front view of the blow molding mold 30, and FIG. 5B is a left side view of the blow molding mold 30. The blow molding mold 30 includes a pair of blow cavity split molds 32 and 32, a bottom mold portion 33, and a swing mechanism 34.

The blow cavity split molds 32 and 32 are mold members that define the shape of the container 10 excluding the bottom surface portion. The blow cavity split molds 32 and 32 are divided by a parting plane along an up-and-down direction (Z direction) in FIGS. 5A and 5B, and are configured to be openable and closable in a left-and-right direction (Y direction) in FIG. 5B.

The bottom mold portion 33 is a mold member that defines the shape of the bottom portion 13 of the container 10 and is closed together with the blow cavity split molds 32 and 32 to form a mold space S of the container 10. The bottom mold portion 33 accommodates a holding portion 35 that sandwiches the protrusion portion 23 of the preform 20 on the upper surface side facing the mold space S. The holding portion 35 has a claw that can be opened and closed by a link mechanism 35a, and is configured to sandwich the protrusion portion 23 by shifting the claw from the open state to the closed state.

The swing mechanism 34 is disposed below the blow cavity split molds 32, and moves the bottom mold portion 33 on a plane (XZ plane) perpendicular to the opening and closing direction of the blow cavity split molds 32.

The swing mechanism 34 includes cam followers 36 provided on both side portions of the bottom mold portion 33 in the left-and-right direction, and a pair of cam members 37 disposed in the left-right direction with the bottom mold portion 33 interposed therebetween and each facing a side surface of the bottom mold portion. The cam members 37 are formed with cam grooves 37a that engage with the cam followers 36.

The trajectory of the cam groove 37a forms an arc-shaped trajectory with the position where the neck mold 151 is disposed serving as a center point. One end of the cam groove 37a is set such that the bottom mold portion 33 is positioned immediately below the neck mold 151. In addition, the other end of the cam groove 37a is set at a position where the bottom mold portion 33 matches the mold space S of the blow cavity split molds 32. By guiding the cam followers 36 on the cam grooves 37a of the cam members 37, the bottom mold portion 33 is movable from the position immediately below the neck mold 151 to the position of the mold space S of the blow cavity split molds 32.

Referring back to FIG. 3, the taking-out unit 140 is configured to release the neck portion 11 of the container 10 manufactured by the blow molding unit 130 from the neck mold 151 and take out the container 10 to the outside of the blow molding apparatus 100.

Description of the Blow Molding Method

Figure 6:
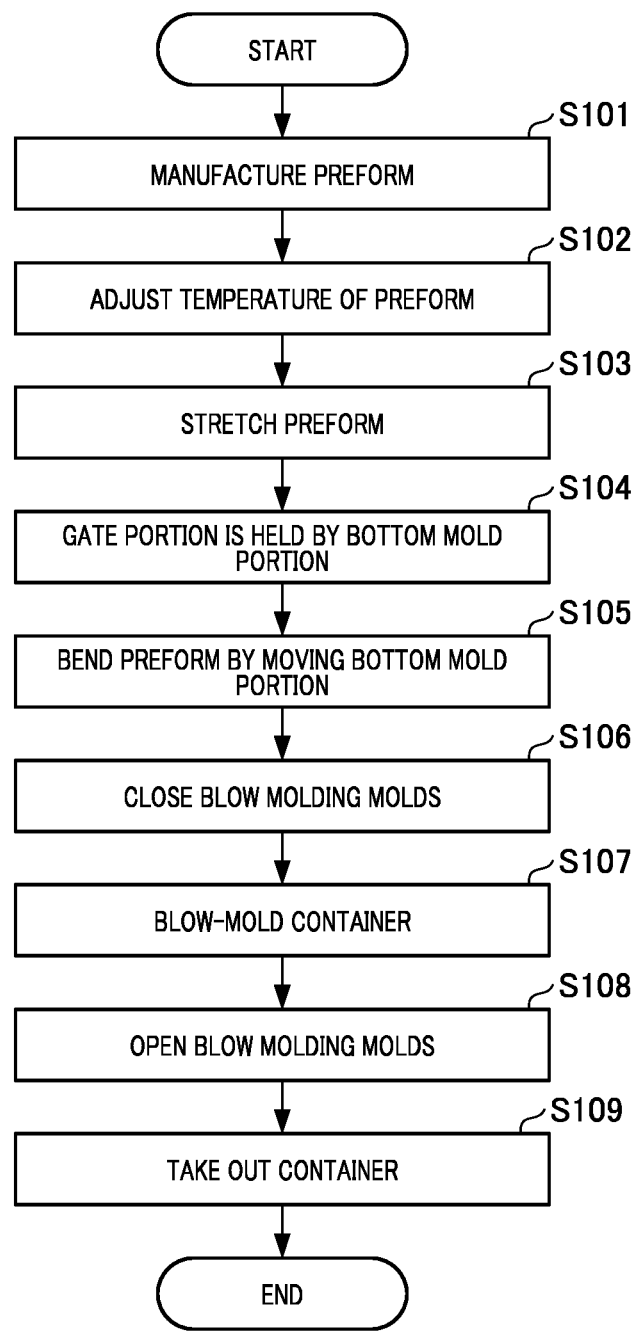
FIG. 6 is a flowchart illustrating processes of a blow molding method.

Next, the blow molding method by the blow molding apparatus 100 of the present embodiment will be described. FIG. 6 is a flowchart illustrating processes of the blow molding method.

First, in the injection molding unit 110, resin is injected from the injection apparatus 112 into the mold space formed by the injection cavity mold, the injection core mold, and the neck mold 151 to manufacture the preform 20 illustrated in FIGS. 2A to 2C (step S101).

Subsequently, the rotary plate of the conveyance mechanism 150 rotates a predetermined angle, and the preform 20 in a state containing the residual heat during injection molding is conveyed to the temperature adjustment unit 120. In the temperature adjustment unit 120, temperature adjustment for bringing the temperature of the preform 20 close to a temperature suitable for final blowing is performed (step S102).

At this time, the body portion 21 of the preform 20 is heated to about a temperature suitable for the final blowing by the heating pot mold 122 of the temperature adjustment mold 121, while the protrusion portion 23 of the preform 20 is cooled by the cooling unit 123 to a temperature lower than the body portion 21. Therefore, the protrusion portion 23 of the preform 20 remains cured, and the protrusion portion 23 of the temperature adjustment unit has a small internal heat quantity as compared with the body portion 21 after the temperature adjustment and is hardly deformed.

Subsequently, the rotary plate of the conveyance mechanism 150 rotates a predetermined angle, and the preform 20 whose temperature has been adjusted is conveyed to the blow molding unit 130.

FIG. 7A illustrates a state in which the preform 20 is disposed at a predetermined position in the blow molding unit 130. Then, as illustrated in FIG. 7B, the stretching rod 31 is inserted into the preform 20, and the preform 20 is stretched so that the bottom portion of the preform 20 reaches the position of the bottom mold portion 33 by lowering the stretching rod 31 (step S103).

When the bottom portion of the preform 20 reaches the position of the bottom mold portion 33, the protrusion portion 23 of the preform 20 is sandwiched and held by the holding portion 35 of the bottom mold portion 33 (step S104). Then, the stretching rod 31 is raised, and the stretching rod 31 is pulled out from the preform 20.

Figure 8A:
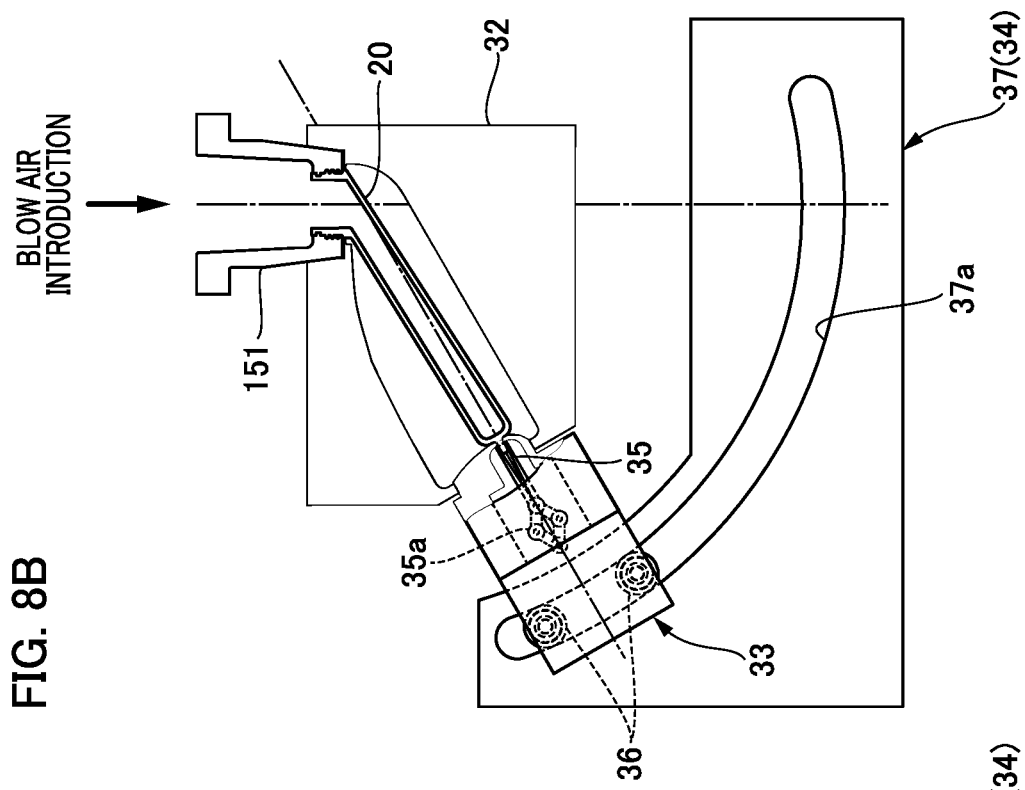
FIGS. 8A and 8B are continuation of FIGS. 7A and 7B.

Subsequently, the swing mechanism 34 is operated to move the bottom mold portion 33 along the cam grooves 37a from the position on the one end side of the cam grooves 37a toward the position on the other end side. Thus, in the preform 20 in which the neck portion 24 is held by the neck mold 151 and the protrusion portion 23 is held by the holding portion 35 of the bottom mold portion 33, the bottom portion side moves obliquely upward from the position immediately below the neck mold 151 as a result of the movement of the bottom mold portion 33. Thus, as illustrated in FIG. 8A, the preform 20 is bent in the vicinity of the neck portion 24 while being held by the bottom mold portion 33 (step S105).

Here, while the position of the neck portion 24 of the preform 20 is fixed, the protrusion portion 23 of the preform 20 is held and moved by the holding portion 35 of the bottom mold portion 33. Therefore, a force in a shear direction acts on the protrusion portion 23 of the preform 20 as a result of the movement of the bottom mold portion 33. However, the protrusion portion 23 cooled by the temperature adjustment mold 121 has a small internal heat quantity and is hardly deformed as described above. Therefore, the protrusion portion 23 is hardly deformed by the force applied when the bottom mold portion 33 moves, and the bottom portion 22 of the preform 20 is hardly displaced with respect to the bottom mold portion 33. In other words, the bottom portion 22 of the preform 20 is accurately positioned on the bottom mold portion 33 after moving, and the thickness distribution and the appearance of the container 10 after blow molding are suppressed from being impaired.

Figure 8B:
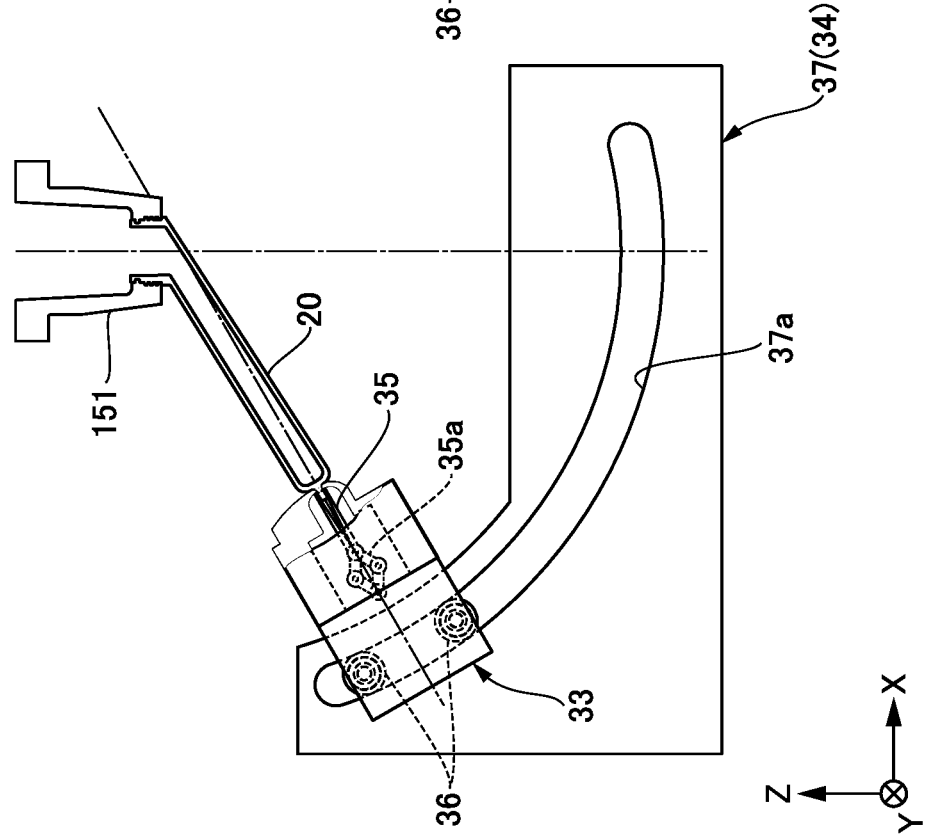

When the bottom mold portion 33 moves to the position on the other end side of the cam grooves 37a, as illustrated in FIG. 8B, the blow cavity split molds 32 and 32 are closed, and the preform 20 is accommodated in the blow cavity split molds 32 and 32 (step S106). In this state, the mold space S corresponding to the container 10 is formed by closing the neck mold 151, the blow cavity split molds 32 and 32, and the bottom mold portion 33.

Figure 9A:
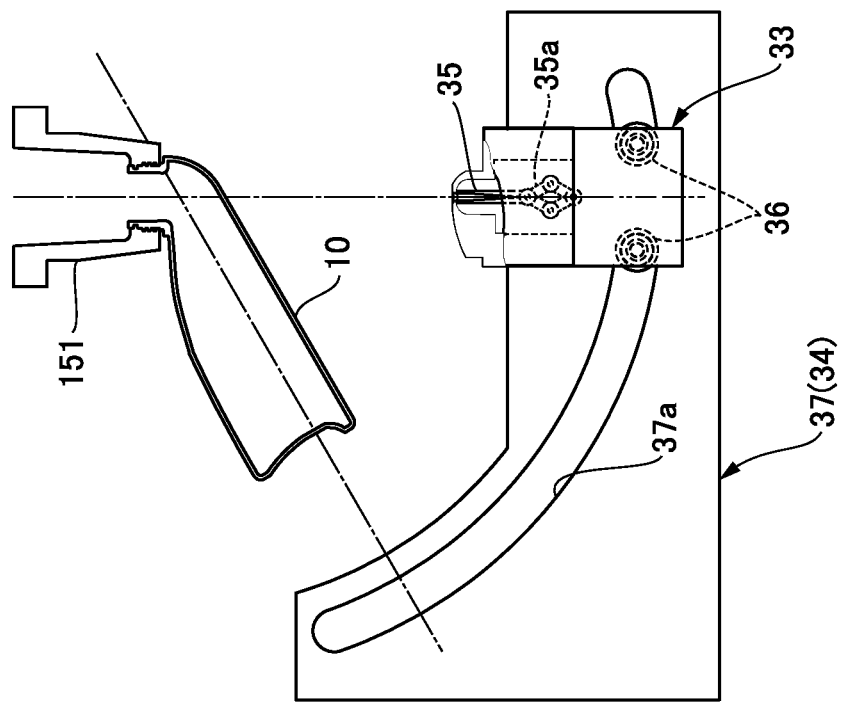
FIGS. 9A and 9B are continuation of FIGS. 8A and 8B.

Subsequently, as illustrated in FIG. 9A, blow air, which is an example of a pressurized fluid, is introduced into the preform 20 through a blow nozzle, and the preform 20 is finally blow-molded into the container 10 (step S107).

In the hot parison type blow molding, the preform 20 is more likely to be deformed as the internal heat quantity of the preform 20 is larger. When the thickness of the preform 20 is large, the internal heat quantity of the preform 20 tends to be large.

In the preform 20 of the present embodiment, the thickness $t_1$ of the first region 25 corresponding to the container long diameter side is set to be thicker than the thickness $t_2$ of the second region 26 corresponding to the container short diameter side. That is, in the preform 20, in the circumferential direction, the first region 25 corresponding to the surface extending on the container long diameter side is more likely to be deformed than the second region 26 corresponding to the surface extending on the container short diameter side since the internal heat quantity is larger.

Therefore, when the blow air is introduced into the preform 20, the first region 25 having a larger internal heat quantity is stretched earlier in the circumferential direction of the preform 20, and the second region 26 having a smaller internal heat quantity is stretched later. Thus, the second region 26 of the preform 20 corresponding to the surface extending on the container short diameter side is not excessively stretched, and the shoulder portion 15 (region A surrounded by a chain line in FIGS. 1A and 1B) of the container 10 positioned on the surface extending on the container short diameter side can be thickened.

In addition, the thickness of the first region 25 of the preform 20 is set such that the other end side (bottom portion side) is thicker than the one end side (opening side). The preform 20 is more likely to be deformed on the bottom portion side than on the opening side in the axial direction because the internal heat quantity is larger.

Therefore, when the blow air is introduced into the preform 20, the bottom portion side having a larger internal heat quantity is stretched earlier in the axial direction of the first region 25 of the preform 20, and the opening side having a smaller internal heat quantity is stretched later. Thus, the material also spreads to the peripheral edge of the bottom portion of the container 10 on the surface extending on the long diameter side of the container 10, and heel portions (regions B surrounded by chain lines in FIGS. 1A and 1B) located at the peripheral edge of the bottom portion of the container 10 can be thickened.

As described above, in the present embodiment, the shoulder portion and the heel portions of the neck bent container can be thickened, and the strength of the container 10 at these portions can be improved. In addition, since the shoulder portion and the heel portions of the container 10 are thickened, the thickness distribution of the entire container 10 is also improved, and the aesthetic appearance of the container 10 is also improved.

Figure 9B:
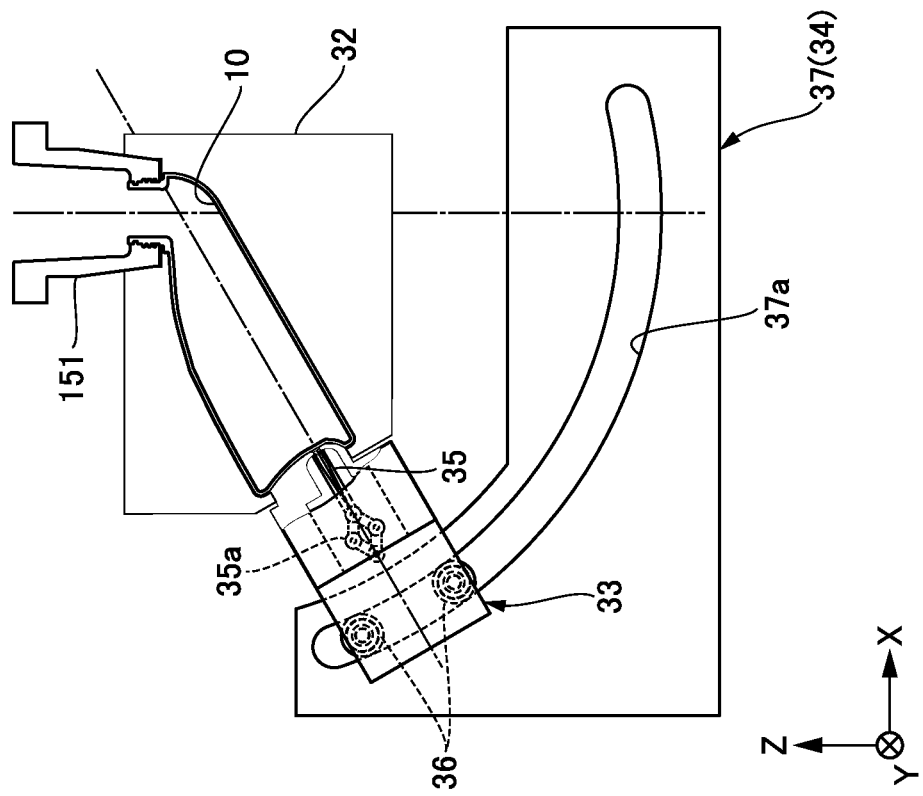

As illustrated in FIG. 9B, after the final blowing molding, the blow cavity split molds 32 and 32 and the bottom mold portion 33 are opened, and the holding of the protrusion portion 23 by the holding portion 35 of the bottom mold portion 33 is released (step S108). Thus, the container 10 after blow molding becomes movable. Note that after the container 10 is detached, the bottom mold portion 33 returns to the position on the one end side of the cam grooves 37a by the operation of the swing mechanism 34.

Subsequently, the rotary plate of the conveyance mechanism 150 rotates a predetermined angle, and the container 10 is conveyed to the taking-out unit 140. In the taking-out unit 140, the neck portion 11 of the container 10 is released from the neck mold 151, and the container 10 is taken out to the outside of the blow molding apparatus 100 (step S109).

Thus, the series of processes of the blow molding method is ended. Then, by rotating the rotary plate of the conveyance mechanism 150 a predetermined angle, the processes of S101 to S109 described above are repeated.

The present invention is not limited to the above embodiments, and various improvements and design changes may be made without departing from the gist of the present invention.

For example, in the embodiment described above, the case where the neck bent container is manufactured as an example of the off-center container has been described. However, the present invention can also be applied to the case of manufacturing an off-center container having a large off-centering degree of the central axis of the container body portion or the container bottom portion with respect to the central axis of the container neck portion.

In addition, in the final blowing molding, the medium for pressurizing the preform is not limited to air, and a gas other than air or a liquid such as water may be used as the pressurizing medium.

In addition, the process of stretching the preform 20 in step S103 described in the above embodiment may be performed in the manner described below.

FIGS. 10A and 10B are views illustrating a modification of a preform stretching process.

First, as illustrated in FIG. 10A, the stretching rod 31 is lowered as much as a predetermined stroke from the standby position, and the tip portion of the stretching rod 31 is brought into contact with the inner surface of the bottom portion of the preform 20. Then, the stretching rod 31 is further lowered to stretch the preform 20, and the protrusion portion 23 is sandwiched by the holding portion 35 of the bottom mold portion 33. When the tip portion of the stretching rod 31 and the preform 20 come into contact with each other, the bottom portion region of the preform 20 is cooled. Thus, the bottom surface portion of the container 10 after blow molding is easily thickened. In addition, in the example of FIGS. 10A and 10B, the tip portion of the stretching rod 31 preferably has a large diameter in order to increase the contact area with the bottom portion region of the preform 20.

Here, as illustrated in FIG. 10A, the preform 20 after stretching has a substantially curved shape in which the body portion 21 is narrowed, and when the stretching rod 31 is raised, it interferes with the body portion 21. Therefore, as illustrated in FIG. 10B, air (pressurizing medium) is introduced into the preform 20 from a blow nozzle, which is not illustrated, to expand the preform 20 a predetermined amount (primary blow or preliminary blow).

By this primary blow, the stretching rod 31 does not interfere with the body portion 21 of the preform 20, and the stretching rod 31 can be raised to the standby position.

Then, the swing mechanism 34 is operated to bend the preform 20 expanded a predetermined amount while maintaining the pressurized state by the movement of the bottom mold portion 33. The pressurized state is maintained to prevent irregular shrinkage of the preform 20 that can occur during exhaustion. The subsequent processes are the same as those after step S106 in the above embodiment, and thus duplicate description will be omitted.

Additionally, the embodiments disclosed herein are to be considered in all respects as illustrative and not restrictive. The scope of the present invention is indicated not by the above description but by the claims, and it is intended that meanings equivalent to the claims and all modifications within the scope are included.

The invention claimed is:

1. A method of manufacturing a neck bent container comprising:
    injection molding a preform having a bottomed cylindrical shape, the preform being made of resin,
    stretching the preform containing residual heat from the injection molding with a stretching rod; and
    blow-molding the neck bent container, in which a central axis of a container neck portion is inclined with respect to an axial direction of a container body portion, by introducing a pressurized fluid into the preform disposed in a mold, wherein
    the container body of the neck bent container has a flat shape in which a dimension in a first direction in a container cross section is longer than a dimension in a second direction of the container cross section that is perpendicular to the first direction,
    the container neck portion is inclined in the first direction,
    in a circumferential cross section of the preform, a thickness of a first region corresponding to a surface extending in the first direction of the container cross section is set to be thicker than a thickness of a second region corresponding to a surface extending in the second direction of the container cross section, and
    the thickness of the first region in the axial cross section is set to be thicker on a bottom portion side than an opening side.

2. The method of manufacturing the neck bent container according to claim 1, further comprising
    heating the preform in a temperature adjustment mold to adjust a temperature before the blow molding.

3. The method of manufacturing the neck bent container according to claim 2, wherein
    the preform includes a protrusion portion protruding outward from a bottom portion, and
    the method further comprises cooling of the protrusion portion by a cooler disposed at a bottom portion of the temperature adjustment mold when adjusting the temperature.

4. The method of manufacturing the neck bent container according to claim 3, wherein the blow molding further comprises:
    stretching the preform that is heated with the stretching rod in a blow mold,
    holding the protrusion portion of the preform that is stretched by the stretching rod in a bottom mold of the blow mold, and bending the preform by moving the bottom mold in the first direction to perform the blow molding afterwards.

5. The method of manufacturing the neck bent container according to claim 4, wherein a material of the preform and the neck bent container includes polypropylene.

* * * * *